United States Patent
Shukla et al.

(10) Patent No.: US 11,524,543 B2
(45) Date of Patent: *Dec. 13, 2022

(54) SYSTEMS AND METHODS FOR DETERMINING VEHICLE CHARACTERISTICS

(71) Applicant: Oshkosh Defense, LLC, Oshkosh, WI (US)

(72) Inventors: Deepak Shukla, Oshkosh, WI (US); Ron Zhang, Oshkosh, WI (US); David Hansen, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 107 days.

This patent is subject to a terminal disclaimer.

(21) Appl. No.: 16/999,732

(22) Filed: Aug. 21, 2020

(65) Prior Publication Data
US 2020/0384823 A1 Dec. 10, 2020

Related U.S. Application Data

(63) Continuation of application No. 15/957,513, filed on Apr. 19, 2018, now Pat. No. 10,752,075.
(Continued)

(51) Int. Cl.
*B60G 17/019* (2006.01)
*B60G 17/018* (2006.01)
(Continued)

(52) U.S. Cl.
CPC ........ *B60G 17/01941* (2013.01); *B60G 11/27* (2013.01); *B60G 17/0164* (2013.01);
(Continued)

(58) Field of Classification Search
CPC ............ B60G 17/0182; B60G 2400/60; B60G 11/27; B60G 17/01908; B60G 2400/61;
(Continued)

(56) References Cited

U.S. PATENT DOCUMENTS 5,013,062 A 5/1991 Yonekawa et al.
5,171,121 A 12/1992 Smith et al.
(Continued)

FOREIGN PATENT DOCUMENTS

| CA | 2273950 A1 | * | 6/1998 | |
| CA | 3056935 A1 | | 11/2018 | |
| FR | 3031721 A1 | * | 7/2016 | ........... B60G 17/019 |

*Primary Examiner* — Karen Beck
(74) *Attorney, Agent, or Firm* — Foley & Lardner LLP

(57) ABSTRACT

A vehicle includes a sprung mass including a cabin coupled to a chassis, tractive assemblies each including at least one tractive element, springs coupling the tractive elements to the sprung mass, each spring imparting an upward force on the sprung mass, load sensors each configured to provide a signal indicative of the force imparted by one of the springs, and a controller operatively coupled to the load sensors. The controller is configured to determine a weight of the sprung mass using the signals from the load sensors and monitor at least one operational condition of the vehicle. The controller is configured to determine whether or not to disable determination of the weight based on the at least one operational condition.

20 Claims, 7 Drawing Sheets

Related U.S. Application Data

(60) Provisional application No. 62/491,675, filed on Apr. 28, 2017, provisional application No. 62/491,667, filed on Apr. 28, 2017.

(51) Int. Cl.
| | | |
|---|---|---|
| *B60C 23/00* | (2006.01) | |
| *B60G 11/27* | (2006.01) | |
| *B60G 17/052* | (2006.01) | |
| *G01G 19/10* | (2006.01) | |
| *G01M 1/12* | (2006.01) | |
| *B60G 17/016* | (2006.01) | |
| *G01L 1/02* | (2006.01) | |
| *G01L 5/13* | (2006.01) | |
| *B60G 17/04* | (2006.01) | |
| *B60G 17/015* | (2006.01) | |

(52) U.S. Cl.
CPC ... *B60G 17/0182* (2013.01); *B60G 17/01908* (2013.01); *B60G 17/052* (2013.01); *G01G 19/10* (2013.01); *G01L 1/02* (2013.01); *G01L 5/136* (2013.01); *G01M 1/122* (2013.01); *B60C 23/003* (2013.01); *B60G 17/016* (2013.01); *B60G 17/0155* (2013.01); *B60G 17/04* (2013.01); *B60G 2400/61* (2013.01)

(58) Field of Classification Search
CPC ....... G01M 1/122; G01G 19/10; G01L 5/136; B60C 23/002
See application file for complete search history.

(56) References Cited

U.S. PATENT DOCUMENTS

| | | |
|---|---|---|
| 5,732,787 A | 3/1998 | Hirahara et al. |
| 5,845,723 A | 12/1998 | Hirahara et al. |
| 6,633,006 B1 * | 10/2003 | Wolf ................ B60T 8/172 177/136 |
| 7,302,320 B2 | 11/2007 | Nasr et al. |
| 7,949,445 B2 | 5/2011 | Poilbout |
| 8,000,850 B2 | 8/2011 | Nasr et al. |
| 8,437,982 B2 * | 5/2013 | Minoshima ........... G01G 19/10 702/174 |
| 8,459,619 B2 | 6/2013 | Trinh et al. |
| 8,695,998 B1 | 4/2014 | Karel et al. |
| 9,114,804 B1 | 8/2015 | Shukla et al. |
| 9,127,738 B2 | 9/2015 | Ellifson et al. |
| 9,132,736 B1 | 9/2015 | Shukla et al. |
| 9,303,715 B2 | 4/2016 | Dillman et al. |
| 9,376,102 B1 | 6/2016 | Shukla et al. |
| 9,452,750 B2 | 9/2016 | Shukla et al. |
| 9,650,032 B2 | 5/2017 | Kotloski et al. |
| 9,656,659 B2 | 5/2017 | Shukla et al. |
| 9,765,841 B2 | 9/2017 | Ellifson et al. |
| 9,821,789 B2 | 11/2017 | Shukla et al. |
| 9,908,520 B2 | 3/2018 | Shukla et al. |
| 9,944,145 B2 | 4/2018 | Dillman et al. |
| 10,029,555 B2 | 7/2018 | Kotloski et al. |
| 10,030,737 B2 | 7/2018 | Dillman et al. |
| 2006/0076741 A1 | 4/2006 | Lim |
| 2006/0192354 A1 | 8/2006 | Van Cayzeele |
| 2014/0316637 A1 * | 10/2014 | Rhode ................ B60G 17/0182 701/29.1 |
| 2017/0001672 A1 | 1/2017 | Bodin |
| 2017/0225535 A1 | 8/2017 | Batsch et al. |
| 2018/0052037 A1 * | 2/2018 | Minoshima ........ B60G 17/0182 |
| 2018/0052038 A1 | 2/2018 | Minoshima |
| 2019/0255903 A1 | 8/2019 | Hirao et al. |

* cited by examiner

SYSTEMS AND METHODS FOR DETERMINING VEHICLE CHARACTERISTICS

CROSS-REFERENCE TO RELATED PATENT APPLICATIONS

This application is a continuation of U.S. application Ser. No. 15/957,513, filed Apr. 19, 2018, which claims the benefit of U.S. Provisional Application No. 62/491,667, filed Apr. 28, 2017, and U.S. Provisional Application No. 62/491,675, filed Apr. 28, 2017, all of which are incorporated herein by reference in their entireties.

BACKGROUND

Vehicles have limited ability to accurately estimate their weights and the locations of their center of gravity. The weight of a vehicle and the location of its center of gravity may change throughout operation of the vehicle, such as when being reconfigured between an armored configuration and an unarmored configuration, or when loaded up with material, equipment, or passengers. The weight of a vehicle may be used to determine how heavily loaded the vehicle is, may have an impact on the terrains and locations over which the vehicle can travel (e.g., due to weight limits on bridges or other structures), and affects the performance of the vehicle (e.g., the response of a suspension system). The stability of a vehicle is determined in part by the location of its center of gravity, and information regarding the location of this center of gravity can be used to increase the stability of the vehicle.

SUMMARY

One exemplary embodiment relates to a vehicle including a sprung mass including a cabin coupled to a chassis, tractive assemblies each including at least one tractive element, springs coupling the tractive elements to the sprung mass, each spring imparting an upward force on the sprung mass, load sensors each configured to provide a signal indicative of the force imparted by one of the springs, and a controller operatively coupled to the load sensors. The controller is configured to determine a weight of the sprung mass using the signals from the load sensors and monitor at least one operational condition of the vehicle. The controller is configured to determine whether or not to disable determination of the weight based on the at least one operational condition.

Another exemplary embodiment relates to a vehicle including a sprung mass including a cabin coupled to a chassis, the sprung mass having a center of gravity, tractive assemblies each including at least one tractive element, springs coupling the tractive elements to the sprung mass, each spring configured to impart a upward force on the sprung mass, load sensors each configured to provide a signal indicative of the force imparted by one of the springs, and a controller operatively coupled to the load sensors. The controller is configured to determine a longitudinal location of the center of gravity based on a longitudinal location of each tractive assembly and the force imparted on the sprung mass by each of the springs.

Yet another exemplary embodiment relates to a control system for a vehicle. The vehicle includes a sprung mass supported by springs. Each spring is configured to impart an upward force on the sprung mass. The control system includes a plurality of load sensors each configured to provide a signal indicative of the force imparted by one of the springs, a speed sensor configured to provide a signal indicative of a speed of the vehicle, and a controller operatively coupled to the load sensors and the speed sensor. The controller is configured to determine a weight of the sprung mass using the signals from the load sensors. The controller is configured to disable determination of the weight if the speed of the vehicle is below a threshold speed.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a vehicle includes various components that improve performance relative to traditional systems. A suspension controller performs a weight estimation of the vehicle using information from gas springs that support the vehicle. The suspension controller monitors a number of vehicle conditions and is configured to permit the weight estimation only when the monitored conditions fall inside of certain ranges. While referred to as an "estimation," the determined weight may, in fact, be the weight of the vehicle. A suspension system of the vehicle incorporates a number of gas springs that support a sprung mass of the vehicle. The suspension controller is configured to locate the center of gravity of the sprung mass using pressure information from the gas springs and information concerning the acceleration of the vehicle.

Figure 1:
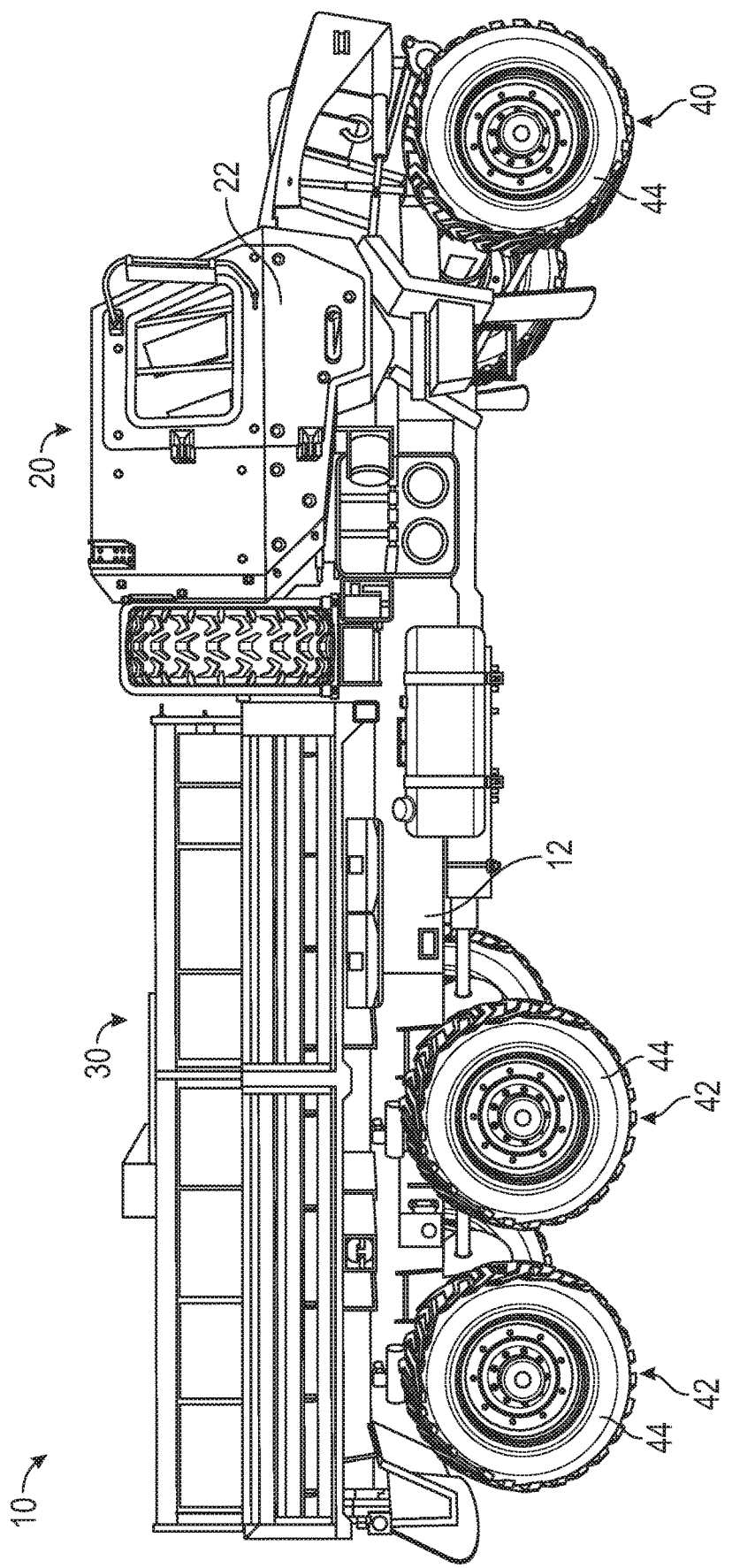
FIG. 1 is a side view of a vehicle, according to an exemplary embodiment.

According to the exemplary embodiment shown in FIG. 1, a vehicle, shown as vehicle 10, includes a chassis, shown as frame 12, that supports a body assembly including a first portion, shown as front cabin 20, and a second portion, shown as mission equipment 30. As shown in FIG. 1, the mission equipment 30 is disposed behind the front cabin 20. The frame 12 of the vehicle 10 engages a plurality of tractive assemblies, shown as front tractive assemblies 40 and rear tractive assemblies 42. According to an exemplary embodiment, the vehicle 10 is a military ground vehicle. In other embodiments, the vehicle 10 is an off-road vehicle such as a utility task vehicle, a recreational off-highway vehicle, an all-terrain vehicle, a sport utility vehicle, and/or still another vehicle. In yet other embodiments, the vehicle 10 is another type of off-road vehicle such as mining, construction, and/or farming equipment. In still other embodiments, the vehicle 10 is an aerial truck, a rescue truck, an aircraft rescue and firefighting (ARFF) truck, a concrete mixer truck, a refuse truck, a commercial truck, a tanker, an ambulance, and/or still another vehicle.

According to an exemplary embodiment, the frame 12 defines a longitudinal axis. The longitudinal axis may be generally aligned with a frame rail of the frame 12 of the vehicle 10 (e.g., front-to-back, etc.). In some embodiments, the vehicle 10 includes a plurality of front tractive assemblies 40 and/or a plurality of rear tractive assemblies 42 (e.g., one, two, etc.). The front tractive assemblies 40 and/or the rear tractive assemblies 42 may include brakes (e.g., disc brakes, drum brakes, air brakes, etc.), gear reductions, steering components, wheel hubs, wheels, tires, and/or other features. As shown in FIG. 1, the front tractive assemblies 40 and the rear tractive assemblies 42 each include tractive elements, shown as wheel and tire assemblies 44. In other embodiments, at least one of the front tractive assemblies 40 and the rear tractive assemblies 42 include a different type of tractive element (e.g., a track, etc.).

According to an exemplary embodiment, the front cabin 20 includes one or more doors, shown as doors 22, that facilitate entering and exiting an interior of the front cabin 20. The interior of the front cabin 20 may include a plurality of seats (e.g., two, three, four, five, etc.), vehicle controls, driving components (e.g., steering wheel, accelerator pedal, brake pedal, etc.), etc. According to the exemplary embodiment shown in FIG. 1, the mission equipment 30 includes a cargo body configured to facilitate transporting various military equipment (e.g., medical supplies, ammunition, weapons, missiles, personnel, etc.). In other embodiments, the mission equipment 30 includes a truck bed or a flat bed. In some embodiments, the mission equipment 30 additionally or alternatively includes a boom lift. In another embodiment, the mission equipment 30 includes an at least partially enclosed troop transport cabin configured to facilitate transporting troops (e.g., eight, ten, twelve, twenty, etc.) with the vehicle 10.

According to an exemplary embodiment, the vehicle 10 includes a powertrain system. The powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may receive fuel (e.g., gasoline, diesel, etc.) from a fuel tank and combust the fuel to generate mechanical energy. A transmission may receive the mechanical energy and provide an output to the generator. The generator may be configured to convert mechanical energy into electrical energy that may be stored by the energy storage device. The energy storage device may provide electrical energy to a motive driver to drive at least one of the front tractive assemblies 40 and the rear tractive assemblies 42. In some embodiments, each of the front tractive assemblies 40 and/or the rear tractive assemblies 42 include an individual motive driver (e.g., a motor that is electrically coupled to the energy storage device, etc.) configured to facilitate independently driving each of the wheel and tire assemblies 44. In some embodiments, a transmission of the vehicle 10 is rotationally coupled to the primary driver, a transfer case assembly, and one or more drive shafts. The one or more drive shafts may be received by one or more differentials configured to convey the rotational energy of the drive shaft to a final drive (e.g., half-shafts coupled to the wheel and tire assemblies 44, etc.). The final drive may then propel or moves the vehicle 10. In such embodiments, the vehicle 10 may not include the generator and/or the energy storage device. The powertrain of the vehicle 10 may thereby be a hybrid powertrain or a non-hybrid powertrain. According to an exemplary embodiment, the primary driver is a compression-ignition internal combustion engine that utilizes diesel fuel. In alternative embodiments, the primary driver is another type of device (e.g., spark-ignition engine, fuel cell, electric motor, etc.) that is otherwise powered (e.g., with gasoline, compressed natural gas, hydrogen, electricity, etc.).

Figure 2:
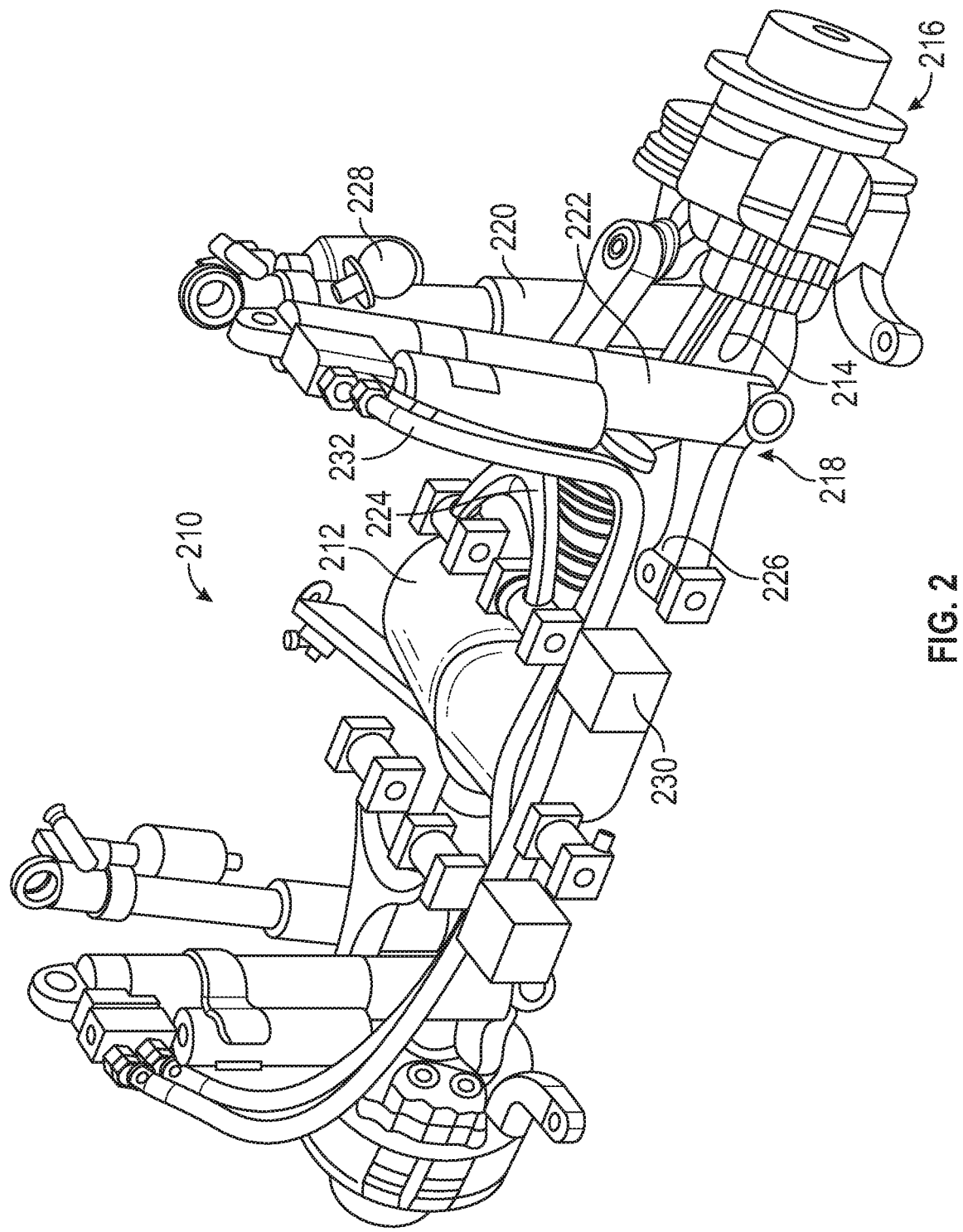
FIG. 2 is a perspective view of an axle assembly, according to an exemplary embodiment.

Referring to FIG. 2, an axle assembly 210 is configured for use with the vehicle 10. The axle assembly 210 may be incorporated into the front tractive assembly 40 and/or the rear tractive assemblies 42. According to an exemplary embodiment, the axle assembly 210 includes a differential 212 connected to half shafts 214, which are each connected to a wheel end assembly 216. The wheel end assembly 216 is at least partially controlled (e.g., supported) by a suspension system 218, which includes a spring 220, a damper 222, an upper support arm 224, and a lower support arm 226 coupling the wheel end assembly 216 to the vehicle body or part thereof (e.g., the frame 12, a chassis, a side plate, a hull, etc.). A stop, shown as cushion stop 228, provides an upper bound to the movement of each wheel end assembly 216.

Figure 3:
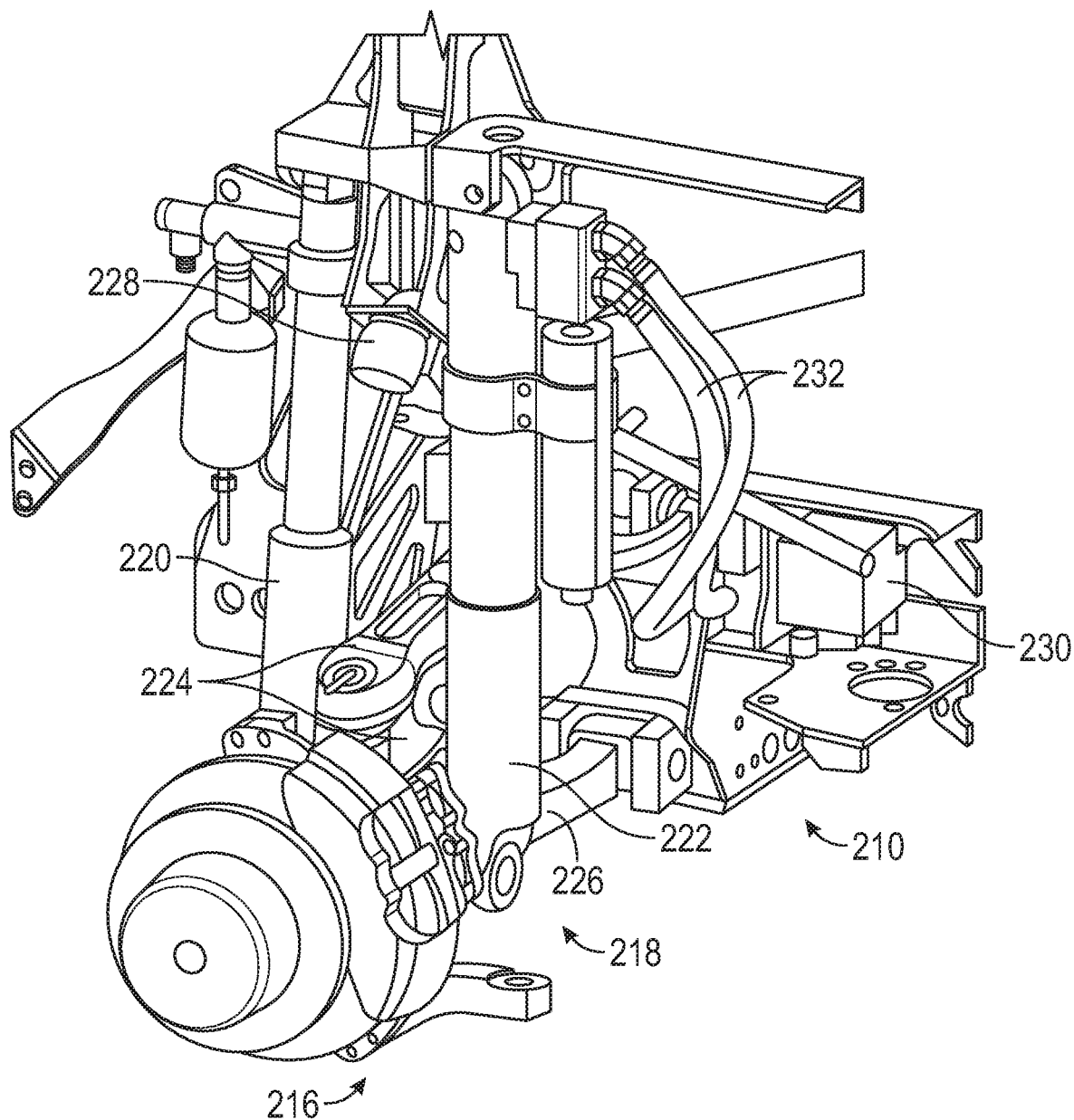
FIG. 3 is another perspective view of the axle assembly of FIG. 2.

Referring to FIG. 3, the suspension system 218 includes one or more high-pressure gas components, where the spring 220 is a high-pressure gas spring. In some embodiments, the suspension system 218 further includes at least one high-pressure gas pump 230. In some such embodiments, the suspension system 218 includes separate high-pressure gas pumps 230 associated with each spring 220 and damper 222 set. In preferred embodiments, the gas of the pump 230 and spring 220 includes (e.g., is at least 90%, at least 95%) an inert gas such as nitrogen, argon, helium, etc., which may be stored, provided, or received in one or more reservoirs (e.g., a central reservoir, a tank, etc.). In some embodiments, the pump 230 is used to control the amount of gas in the spring 220. In other embodiments, one or more valves are used to selectively fluidly couple the spring 220 to one or more reservoirs (e.g., a high-pressure reservoir maintained by the pump 230, a low-pressure reservoir maintained by the pump 230, etc.) to control the amount of gas in the spring 220. One or more of the spring 220, the damper 222, and the pump 230 may be fluidly coupled by one or more conduits, shown as hoses 232.

Figure 4:
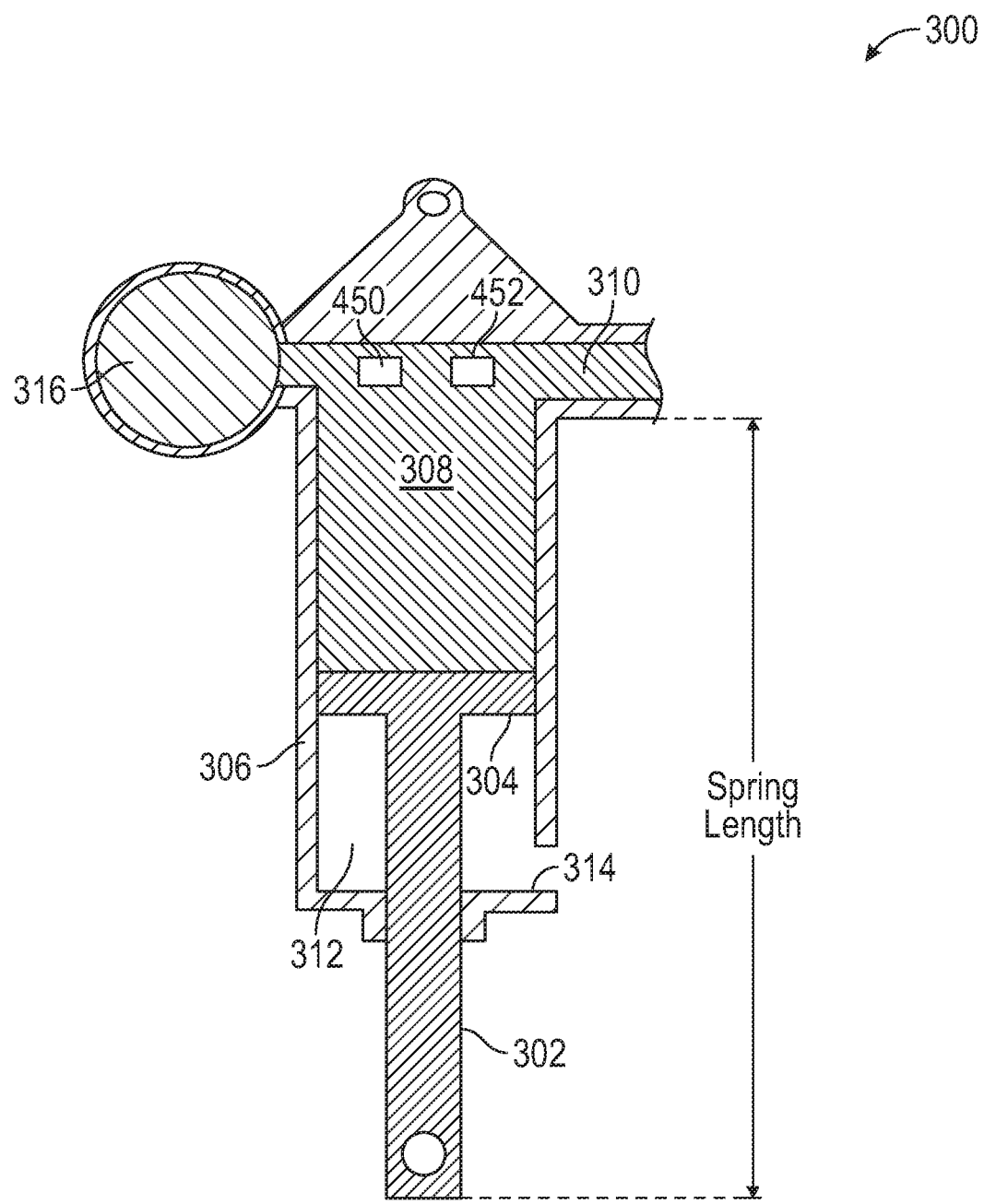
FIG. 4 is a schematic view of a gas spring assembly, according to an exemplary embodiment.

Referring to FIG. 4, a schematic representation of a gas spring 300 is shown. The spring 300 may be functionally substantially the same as the spring 220. The spring 300 includes a rod 302 coupled to a piston 304. The rod 302 and the piston 304 translate within a cylinder 306, and a spring length is defined based on the position of the rod 302 relative to a portion of the cylinder 306. A first chamber 308 is defined between the interior of the cylinder 306 and a face of the piston 304 such that the first chamber 308 expands as the rod 302 extends out of the cylinder 306. The first chamber 308 is configured to be filled with gas such that a pressure is exerted on the piston 304. In some embodiments, the first chamber 308 is substantially sealed aside from a port 310. The port 310 may be selectively fluidly coupled to a reservoir of a higher or lower pressure than the first chamber 308 and/or a pump (e.g., the high pressure gas pump 230)

such that the amount of gas in the first chamber 308 may be varied. The amount of gas in the first chamber 308 may be varied by selectively activating or engaging a valve fluidly coupled to a reservoir or a pump (e.g., the high pressure gas pump 230).

The spring 300 further includes a second chamber 312 defined between the interior of the cylinder 306, a face of the piston 304, and the rod 302 on the opposite side of the piston 304 from the first chamber 308. The second chamber 312 is substantially sealed other than a port 314. In some embodiments, the port 314 fluidly couples the second chamber 312 to the surrounding atmosphere, such that the second chamber 312 experiences atmospheric pressure. Alternatively the second chamber 312 may be pressurized (e.g., by a high pressure gas source such as the pump 230) to actively retract the rod 302 into the cylinder 306. In some embodiments, an accumulator 316 is fluidly coupled to the first chamber 308. The accumulator 316 facilitates the spring 300 providing two different spring rates, depending upon the pressure inside the first chamber 308. By way of example, when the pressure inside the first chamber 308 is less than a charge pressure within the accumulator 316, the accumulator 316 remains fully expanded, and the spring 300 provides a first spring rate. When the pressure inside the first chamber 308 is greater than the charge pressure, the accumulator 316 compresses, and the spring 300 provides a second spring rate.

The amount of force exerted by the spring 300 varies with the pressure in the first chamber 308. By way of example, the force exerted by the spring 300 may be equal to the pressure in the first chamber 308 times the area of the piston 304 that is exposed to the first chamber 308. The pressure in each spring 300 varies with the temperature and amount of gas in the spring 300 and a length of the spring 300 (e.g., the spring length shown in FIG. 4), among other factors. The spring length varies with the ride height of the vehicle 10, and as such, may be used to determine the height of the body assembly of the vehicle 10 relative to the ground.

Figure 5:
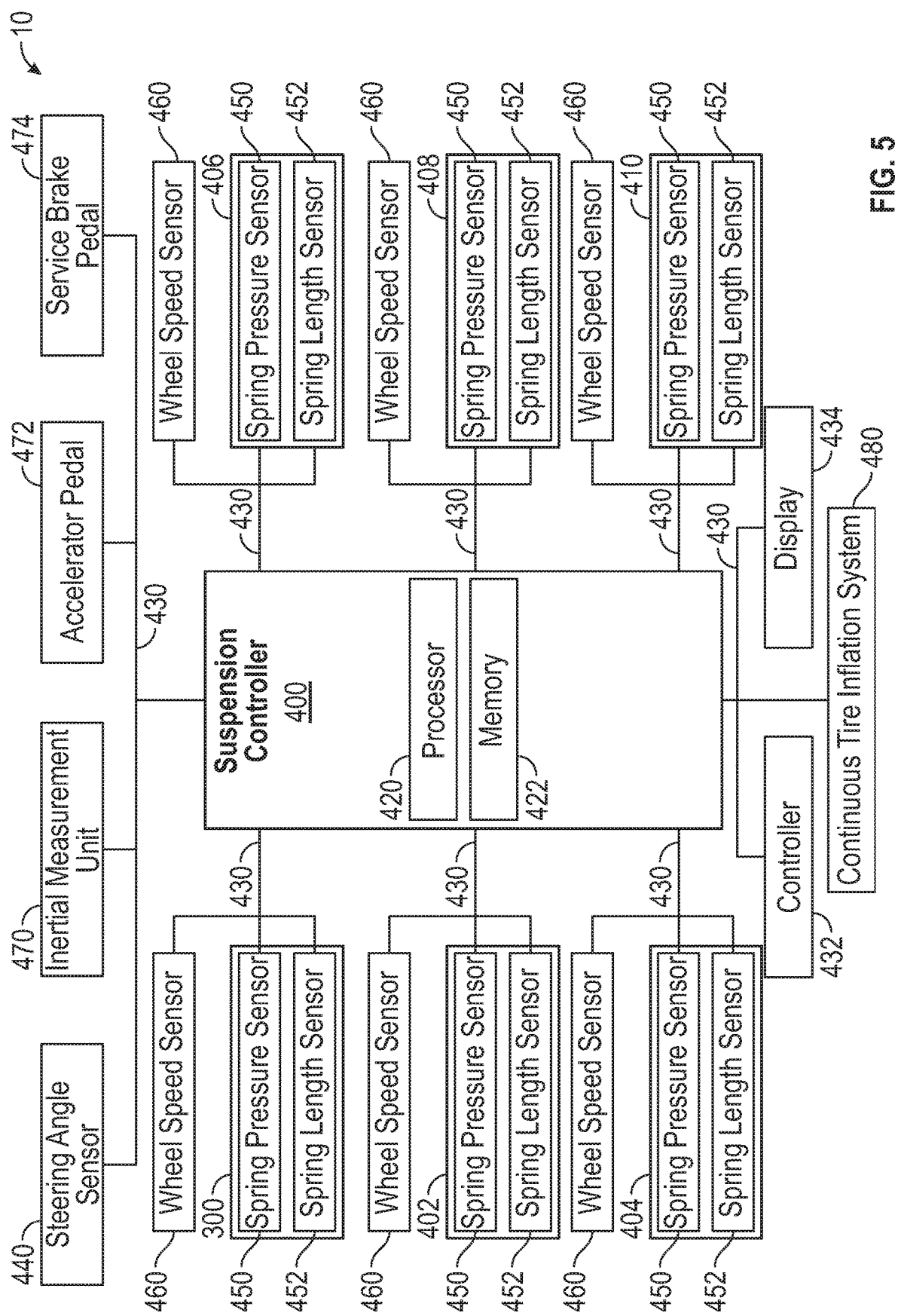
FIG. 5 is a block diagram of a vehicle suspension control system, according to an exemplary embodiment.

Referring now to FIG. 5, a detailed diagram of a vehicle suspension control system is shown, according to an exemplary embodiment. The vehicle suspension control system includes a controller, shown as suspension controller 400. The vehicle 10 is shown to include gas springs 300, 402, 404, 406, 408, and 410 each associated with a different wheel end assembly 216 and wheel and tire assembly 44 of the vehicle 10. The gas springs 300, 402, 404, 406, 408, and 410 may be substantially similar to the gas spring 300. The suspension controller 400 includes a processor 420 and a memory 422. The suspension controller 400 communicates with the springs 300, 402, 404, 406, 408, and 410 through data lines 430. The suspension controller 400 also communicates with an engine control unit, shown as controller 432, and a display 434 (e.g., a touchscreen) through the data lines 430. The data lines 430 may be any type of communications medium capable of conveying electronic data between the suspension controller 400, the springs 300, 402, 404, 406, 408, and 410, the controller 432, the display 434, and the other various sensors of the vehicle 10. The data lines 430 may be wired connections, wireless connections, or a combination of wired and wireless connections. In some embodiments, the data lines 430 are redundant connections. For example, a data line 430 may include two or more independent connections between the suspension controller 400 and the spring 300. In another example, a data line 430 may include individual connections between the suspension controller 400 and the sensors and controls of the spring 300.

The vehicle 10 includes sensors operatively coupled to the suspension controller 400 by data lines 430. The vehicle 10 may include one or more angle sensors, shown as steering angle sensors 440, pressure sensors, shown as spring pressure sensors 450, linear position or length sensors, shown as spring length sensors 452, speed sensors, shown as wheel speed sensors 460, one or more acceleration sensors and/or orientation sensors, shown as inertial measurement units (IMUs) 470, an accelerator interface or accelerator device, shown as accelerator pedal 472, and a brake interface or brake device, shown as service brake pedal 474. Although only these sensors are mentioned specifically, it should be understood that the vehicle 10 may include other types of sensors.

The steering angle sensors 440 may be configured to provide a measurement indicative of the angle of one or more of the front wheels (e.g., the wheel and tire assemblies 44) relative to a longitudinal axis of the vehicle 10 (e.g., as defined by the frame 12). Accordingly, the steering angle sensors 440 provide an indication of (a) if the vehicle 10 is turning (b) the direction in which the vehicle 10 is turning and (c) the magnitude with which the vehicle 10 is turning (e.g., radius of curvature of the current path of the vehicle 10).

As shown in FIG. 4, the pressure sensor 450 is fluidly coupled to the first chamber 308 of the spring 300 and configured to provide a measurement indicative of the pressure of the gas in the first chamber 308. A pressure sensor 450 may be similarly arranged in each of the other springs 402, 404, 406, 408, and 410. In other embodiments, the pressure sensors 450 are otherwise arranged but configured to measure the pressure in the first chamber 308 of each spring. As shown in FIG. 4, the second chamber 312 of the spring 300 is fluidly coupled to the surrounding atmosphere, and accordingly the pressure in the second chamber 312 may be assumed to be atmospheric pressure. In embodiments where the second chamber 312 is fluidly coupled to a high pressure gas source, a second pressure sensor 450 may be used to determine the pressure in the second chamber 312.

Each spring length sensor 452 is configured to provide a measurement indicative of the spring length of the corresponding spring (e.g., as it varies due to actuation of the rod 302). The spring length sensor 452 may be a linear variable differential transformer (LVDT) or another type of length sensor or linear position sensor.

The wheel speed sensors 460 are configured to provide a signal indicative of the rotational speed of one of the wheel and tire assemblies 44. Accordingly, the wheel speed sensor 460 may be used to determine the longitudinal speed and acceleration of the vehicle 10. In some embodiments, each wheel end assembly 216 includes a wheel speed sensor 460. In other embodiments, only one wheel end assembly 216 on each side of the vehicle 10 (e.g., the left and right sides) includes a wheel speed sensor 460. In yet other embodiments, the wheel speed sensors 460 are otherwise arranged (e.g., one wheel end assembly 216 includes a wheel speed sensor 460).

Figure 6:
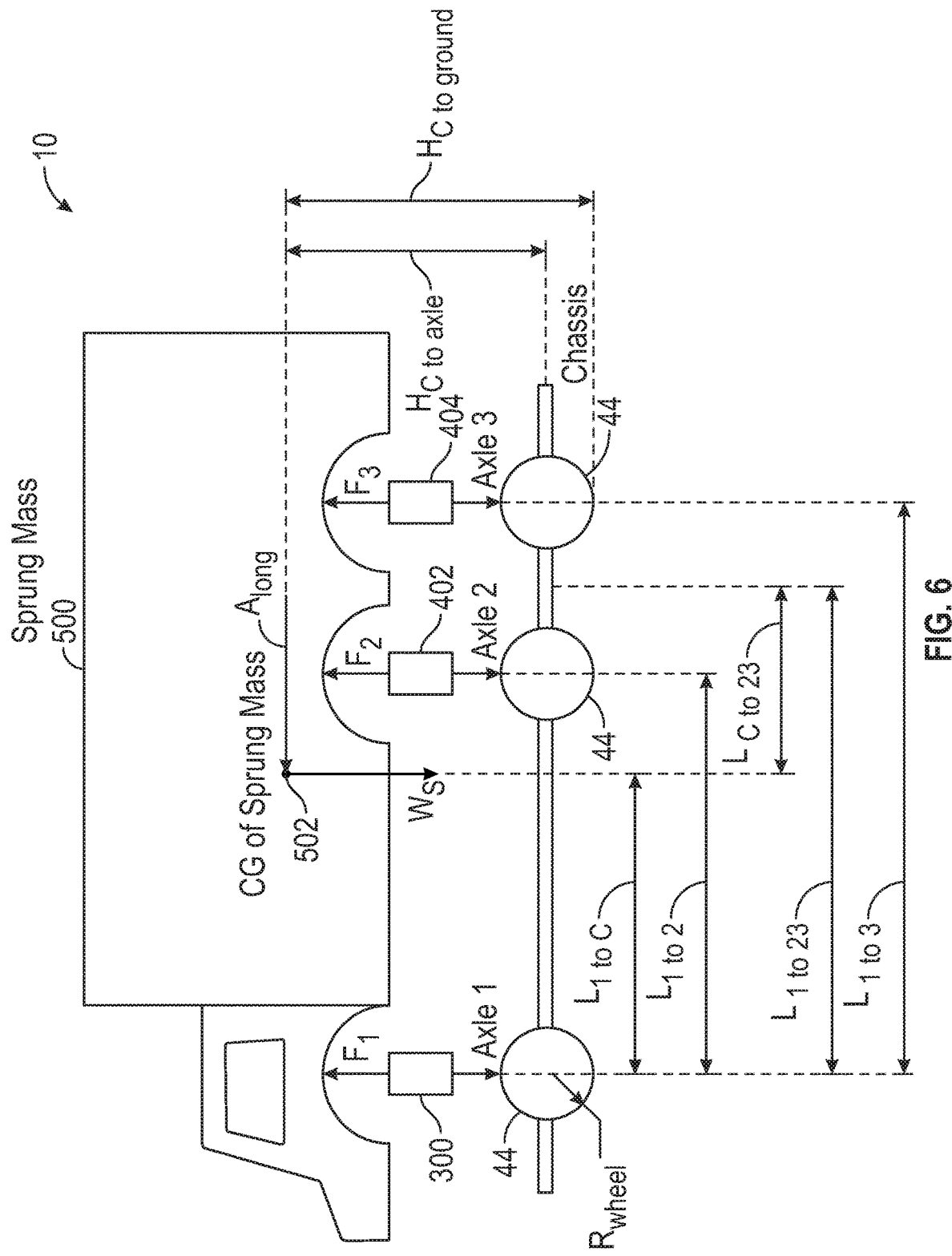
FIG. 6 is a free body diagram of a vehicle as viewed from the left side, according to an exemplary embodiment.

The IMU 470 is configured to measure an acceleration (e.g., a vertical acceleration, a longitudinal acceleration, a lateral acceleration, an overall acceleration, etc.) and an angular orientation of a body to which it is attached. The IMU 470 may include one or more accelerometers and/or gyroscopic sensors. As shown in FIG. 6, the springs 300, 402, 404, 406, 408, and 410 support a sprung mass 500 including the frame 12, the front cabin 20, and the mission equipment 30. In some embodiments, the IMU 470 is attached to the sprung mass 500. In some instances, it is advantageous to locate the IMU 470 at or near a center of gravity 502 of the sprung mass 500. In some embodiments, one or more IMUs 470 are located elsewhere (e.g., on one of the axle assemblies 210) and/or the vehicle 10 includes multiple IMUs 470.

The accelerator pedal 472 is configured to be used by an operator to indicate a desired output of the primary driver of the vehicle 10. By way of example, in response to an operator depressing the accelerator pedal 472, the vehicle 10 may control the primary driver to output a greater speed and/or torque, and accordingly cause the vehicle 10 travel at a greater speed. The service brake pedal 474 is configured such that the vehicle 10 applies a braking force (e.g., to one or more of the wheel and tire assemblies 44) when the service brake pedal 474 is engaged. The service brake pedal 474 may be used by an operator to slow the vehicle 10 during normal operation (e.g., when traveling down a road) and may be included in addition to another brake interface device (e.g., a parking brake lever or valve). The pedals 472 and 474 may be mechanical (e.g., connected to another component by a cable) or electrical (e.g., operatively coupled to a controller (e.g., the suspension controller 400, the controller 432, etc.), which in turn activates another component (e.g., opens a valve, increases the output of a pump, etc.) in response to a signal from the pedal). In some embodiments, the suspension controller 400 is configured to receive signals from one or both of the pedals 472 and 474 or from sensors coupled to the pedals 472 and 474 indicating an extent to which each pedal is engaged (e.g., 5% depressed, etc.).

Referring to FIG. 6, a simplified free body diagram of the vehicle 10 is shown. The sprung mass 500 of the vehicle 10 has a mass M. A weight $W_S$ acts at the center of gravity 502 of the sprung mass 500. The mass M is the combined mass of all of the components that are supported by the springs 300, 402, 404, 406, 408, and 410, including the frame 12, the front cabin 20, the primary driver, and part or all of the mission equipment 30. The weight $W_S$ of the sprung mass 500 is supported by upward forces from the springs 300, 402, 404, 406, 408, and 410, referred to as vertical wheel forces $F_{1,L}$, $F_{2,L}$, $F_{3,L}$, $F_{1,R}$, $R_{2,R}$, and $F_{3,R}$, respectively, where the subscripts 1-3 indicate the axle assembly 210 corresponding with the spring and the subscripts L and R indicate the side of the vehicle 10 (left or right) corresponding with the spring. FIG. 6 is a view of the left side of the vehicle 10. Forces $F_1$, $F_2$, and $F_3$ are the sum of the left and right vertical wheel forces on each respective axle assembly 210. A number of horizontal length measurements in the format of $L_{AtoB}$ are shown, where the subscript designates the two points between which the length is measured. The length measurements correspond with longitudinal distances between the centerlines of the axles (corresponding with subscripts 1, 2, and 3), the center of gravity 502 (corresponding with subscript C), and a point centered between the two rear axles (corresponding with subscript 23). The radius $R_{wheel}$ of the wheel and tire assemblies 44 is additionally shown. $L_{1to2}$, $L_{1to23}$, $L_{1to3}$, and $R_{wheel}$ may be predetermined using the geometry of the vehicle 10 and stored in the memory 422.

Figure 7:
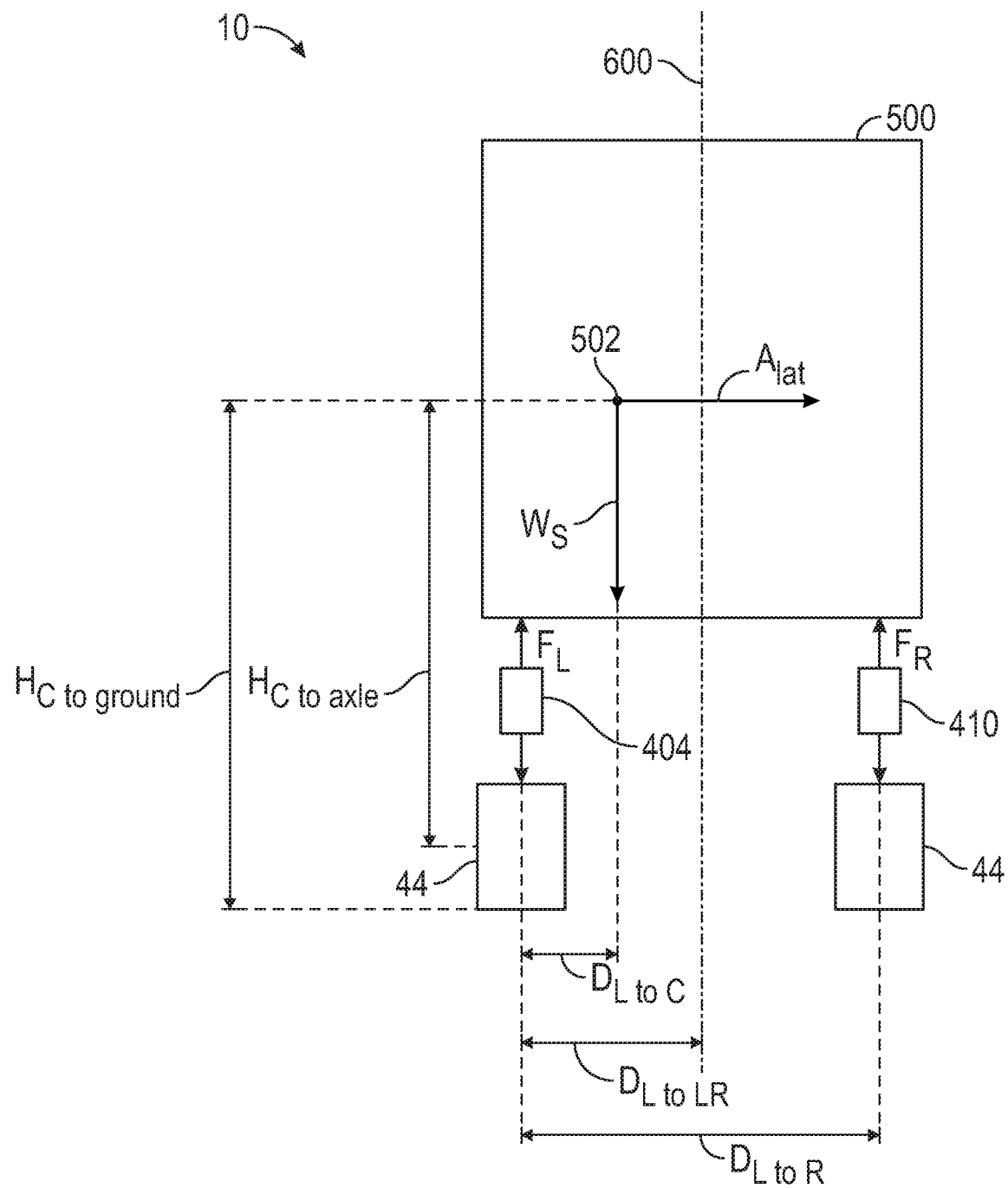
FIG. 7 is a free body diagram of the vehicle of FIG. 6 as viewed from the rear.

Referring to FIGS. 6 and 7, a number of vertical height measurements in the form of $H_{AtoB}$ are shown, where the subscript designates the two points between which the height is measured. In the embodiment shown in FIG. 6, the sprung mass 500 (e.g., the frame 12) is oriented parallel with the ground, which is substantially flat. The height measurements correspond with the vertical distances between the center of gravity 502 (corresponding with the subscript C), a horizontal plane running through the axle centerlines (corresponding with the subscript axle), and a horizontal plane representing the ground (corresponding with the subscript ground). The values associated with the various heights may vary with the geometry of the vehicle 10 and the length of each spring. Various dimensions associated with the geometry of the vehicle 10 may be predetermined and stored in memory 422, and the spring lengths may be determined using the spring length sensors 452.

Referring to FIG. 7, a rear view of the simplified free body diagram of the vehicle 10 is shown. A number of horizontal width measurements in the format of $D_{AtoB}$ are shown, where the subscript designates the two points between which the width is measured. In the embodiment shown in FIG. 7, the sprung mass 500 is oriented parallel to the ground, which is substantially flat. The width measurements correspond with the horizontal distances between the vertical forces of each spring (corresponding with subscripts L and R), the center of gravity 502 (corresponding with subscript C), and a longitudinally and vertically extending center plane 600 of the vehicle 10 (corresponding with subscript LR). As shown, each of the vertical forces act along the centerlines of the left and right wheel and tire assemblies 44. The values associated with the various widths may depend on the geometry of the vehicle 10 and the length of each spring. $D_{LtoLR}$ and $D_{LtoR}$ may be predetermined using the geometry of the vehicle 10 and stored in the memory 422, and the suspension controller 400 may be configured to determine the spring lengths using information from the spring length sensors 452.

The suspension controller 400 may be configured such that the height dimensions corresponding to each spring length are stored in the memory 422. In some embodiments, the sprung mass 500 may have some amount of pitch or roll relative to the ground, and the heights may be determined for each spring individually. In some such embodiments, the IMU 470 facilitates determining a pitch angle and/or a roll angle of the sprung mass 500 and the various lengths and heights associated with the vehicle 10. In other such embodiments, the lengths of each spring or of a number of the springs are used to determine the pitch angle or the roll angle of the sprung mass 500.

The suspension controller 400 is configured to determine or estimate the weight $W_S$ of sprung mass 500. The suspension controller 400 may be configured to simplify the calculation of the weight estimation using one or more assumptions. For example, a linear relationship may be assumed between spring pressures and vertical wheel forces. Certain geometric relationships in the vehicle 10 may be assumed to be uniform (e.g., front and rear track widths are identical, each spring and corresponding wheel end assembly 216 are identical in dimensions, etc.). The sprung mass 500 may be assumed to be supported only by the springs (e.g., by gas pressure within the first chamber 308 acting on the piston 304). In such a case, the suspension controller 400 may adjust each spring away from a travel range limit prior to the weight estimation. In some embodiments, the suspension controller 400 performs the adjustment away from the travel range limit without regard to a particular target spring length, and calculates the weight at any spring length that is not at a travel range limit. For example, each spring may be lowered until it is no longer hitting rebound stops (e.g., the cushion top 228) or raised until it is no longer hitting jounce bumpers. The springs may be assumed to be located in the same longitudinal position with respect to the direction of travel of the vehicle 10 as the corresponding axles. The locations of the springs may alternatively be used for measurement references. The springs may be assumed to be symmetrically located about the longitudinal centerline of the vehicle 10. One skilled in the art would appreciate that any calculations presented herein can be modified accordingly to account for variations from these assumptions.

In conventional suspension systems, the weight of a vehicle is estimated while the vehicle is stationary. Stationary weight estimations have a number of disadvantages compared to the moving weight estimation described herein. While stationary, the assumption that gas pressure in the springs supports the entire weight of the vehicle may not be accurate due to static frictional forces in the springs and lateral tire "scrub" forces caused by lateral movement of the wheels during suspension travel. Additionally, while stationary, the pressures in the springs may not be accurate due to later shifting of the center of gravity of the sprung mass as the vehicle accelerates. Some causes of cabin shifting include acceleration, which causes the front of the vehicle to lift, which, in turn, causes pressures in the front springs to be low and pressures in the rear springs to be high, deceleration, which causes the front of the vehicle to lower, which, in turn, causes pressures in the front springs to be high and pressures in the rear springs to be low, and side-to-side shifting while traveling along a curve (e.g., a curved road), which causes the side of the vehicle inside the curve to lift and the side of the vehicle outside the curve to lower, which, in turn, causes the pressures of the inside springs to be low and the pressures of the outside springs to be high.

The suspension controller 400 is configured to estimate the weight $W_S$ of the sprung mass 500 while the vehicle 10 is moving. In some embodiments, the suspension controller 400 estimates the weight $W_S$ only while the vehicle 10 is moving along a substantially flat road at a substantially constant velocity. Under these conditions, the suspension controller 400 may be configured assuming a negligible force is exerted on the sprung mass 500 by the dampers 222 (e.g., because the sprung mass 500 is stationary relative to each axle assembly 210). Performing the weight estimation while moving reduces or eliminates the static friction and tire "scrub" forces. With minimal acceleration (e.g., traveling at a constant speed along a flat road), the cabin may stay in a normally-balanced or un-shifted state, eliminating the inaccuracies associated with cabin shifting. Due to the reduction or elimination of these inaccuracies, the moving weight estimation of the present invention provides more accurate result than a conventional stationary weight estimation.

The suspension controller 400 estimates the weight $W_S$ using the pressures P in each of the springs. When performing the weight estimation, the suspension controller 400 may instruct the operator (e.g., through the display 434) to drive along a flat road at a constant speed. In other embodiments, the weight estimation is performed while the vehicle 10 is stationary. In some embodiments, the suspension controller 400 calculates the vertical force F imparted by each spring on the sprung mass 500 using the equation:

$$F=PAr \quad (1)$$

where P is the pressure of the gas in the first chamber 308 (e.g., as measured with the pressure sensor 450), A is the area of the piston 307 that is exposed to the pressurized gas, and r is a motion ratio. The motion ratio r is calculated using the equation:

$$r=(\text{Change in spring length})/(\text{Corresponding wheel travel}) \quad (2)$$

and may be constant throughout the travel range of the springs and the same for each spring. The motion ratio r may be predetermined and stored in the memory 422. In embodiments where the second chamber 312 is actively pressurized, the suspension controller 400 may instead calculate the vertical force F for each spring using the equation:

$$F=(P_1A_1-P_2A_2)r \quad (3)$$

where $P_1$ is the pressure in the first chamber 308, $A_1$ is the area of the piston 304 exposed to the gas in the first chamber 308, $P_2$ is the pressure in the second chamber 312, and $A_2$ is the area of the piston 304 exposed to the gas in the second chamber 312. If other types of springs are used (e.g., single acting gas springs including coil springs to retract the rod 302, etc.), the suspension controller 400 may be configured to otherwise calculate each vertical force F.

The suspension controller 400 may be configured to filter (e.g., using a low pass filter) or otherwise alter the measured values (e.g., for pressure) prior to calculating the vertical force F. In some embodiments, the suspension controller 400 is configured to correct for the effect of a sway bar of the vehicle 10 on the pressures measured in the springs. A sway bar provides a moment couple about a lateral axis of the vehicle that affects the load supported by each spring. Using information from each spring length sensor 452, the suspension controller 400 is configured to determine a difference in spring length between the two springs associated with each axle assembly. The suspension controller 400 may include a sway bar force table stored in the memory 422 that relates the vertical wheel force imparted by the sway bar to the difference in length between the two springs. The sway bar force table may account for which spring was more compressed when determining the direction (and sign for mathematical purposes) of the vertical wheel force imparted by the sway bar. The suspension controller 400 is configured to subtract this imparted force from the measured vertical wheel force corresponding to its respective spring. The result is the vertical wheel force due to the pressure of the gas spring, not including the effect of the sway bar forces. By dividing by the cross sectional area of the piston (e.g., the piston 304) and the motion ratio, this corrected force may be used to determine a corrected pressure in each spring. This corrected pressure may be filtered (e.g., through a low pass filter) and used to estimate the weight $W_S$ or in other further calculations. The suspension controller 400 may be configured to repeat this process for each set of springs corresponding to a sway bar.

The controller 400 is configured to calculate the weight $W_S$ of the sprung mass 500 as the sum of the individual vertical wheel forces F. In some embodiments, the suspension controller 400 is configured to calculate the weight $W_S$ multiple sequential times and calculate (e.g., using an average, using a filter, etc.) a refined weight from those individual values. Such a calculation may smooth outlier values (e.g., if the vehicle 10 hits a bump while performing the weight estimation). The suspension controller 400 may be configured to calculate the mass M of the sprung mass 500 by dividing the weight $W_S$ by a gravitational constant g (e.g., 9.81 m/s$^2$). The gravitational constant g may be stored in the memory 422. The gravitational constant g may be varied depending on location or altitude of operation of the vehicle 10, etc.

The suspension controller 400 may use information from the various sensors to determine if the vehicle 10 meets certain operational conditions that improve the accuracy of the weight estimation. These conditions reduce static friction in the springs, reduce weight transfer in the vehicle 10, and reduce dynamic forces on the vehicle 10. These conditions may be used to determine if the vehicle 10 is traveling along a flat road at a constant velocity. Before and/or while performing the weight estimation, the suspension controller 400 may instruct the operator (e.g., through a user interface such as the display 434) to drive along a flat road at a constant speed. If one or more of these operational conditions are not met, the controller 400 may disable the weight estimation (e.g., prevent the weight estimation from beginning, cancel a weight estimation that has already started, etc.). Once the weight estimation has been disabled, the suspension controller 400 may continue to disable weight estimation for a period of time. The period of time may be predetermined or based on the operational conditions that triggered the disablement. It should be understood that the suspension controller 400 is not limited to using the conditions discussed herein. Different conditions that reduce static friction in the springs, reduce weight transfer in the vehicle 10, and/or reduce dynamic forces on the vehicle 10 may be used instead of or in addition to the conditions outlined herein. By way of example, the suspension controller 400 may use the IMU 470 to determine a roll, pitch, or yaw measurement of the vehicle, and develop a condition that one of roll, pitch, or yaw measurements must remain within an acceptable band.

In some embodiments, the suspension controller 400 facilitates an adjustment to the suspension (e.g., an adjustment to the ride height of the vehicle, an adjustment to the suspension stiffness or response, etc.). This suspension adjustment may be applied by an operator and stored in the memory 422 of the suspension controller 400. If the suspension controller 400 determines that a suspension adjustment is active, then the suspension controller 400 may disable the weight estimation operation.

In some embodiments, the suspension controller 400 controls the vehicle 10 according to various suspension operating modes. Each mode may have its own parameters and target conditions (e.g., a ride height of the vehicle 10, a firmness of the suspension response, enabling or disabling certain operator controls, etc.). The suspension controller 400 may change the mode based on a user input (e.g., pressing a button indicating a desired operating mode) or based on a sensor input (e.g., entering a fault mode when the suspension controller 400 detects an abnormal condition, such as a pressure within the spring 300 falling outside of a normal operating range or a loss of connection to one or more sensors). In some embodiments, the suspension controller 400 disables the weight estimation operation unless the suspension is operating in one or more specific modes (e.g., an operational mode, a manual mode, etc.).

In some such embodiments, the suspension controller 400 monitors information (e.g., a signal indicative of a pressure) from one or more sensors (e.g., the pressure sensors 450) and disables the weight estimation operation if the information is not available. Lack of signal may indicate that one or more sensors is not operating correctly. A lack of information from certain sensors may prevent proper weight estimation. By way of example, if one of the pressure sensors 450 is disconnected from the suspension controller 400, the suspension controller 400 may not be able to perform an accurate weight estimation.

In some embodiments, the suspension controller 400 prevents and/or cancels the weight estimation operation if a speed of the vehicle 10 is below a threshold speed (e.g., 5 miles per hour, 10 miles per hour, etc.). The suspension controller 400 may determine the vehicle speed using information from the one or more wheel speed sensors 460. Alternatively, the suspension controller 400 may determine the vehicle speed using information from the IMU 470. Accordingly, the IMU may act as a speed sensor. If the vehicle 10 is traveling too slowly, static friction and tire "scrub" forces may reduce the accuracy of the resulting weight estimation.

In some embodiments, the suspension controller 400 monitors the extent to which each of the pedals 472 and 474 are engaged and disables the weight estimation operation if their level of engagement is outside of a predetermined range. By way of example, the suspension controller 400 may disable the weight estimation operation if the accelerator pedal 472 is pressed past a first threshold level (e.g., beyond 30% engaged, beyond 50% engaged, etc.). If the accelerator pedal 472 is pressed beyond the first threshold level, the vehicle 10 may accelerate and no longer travel at a constant speed. By way of another example, the suspension controller 400 may disable the weight estimation operation if the accelerator pedal 472 is not pressed past a second threshold level (e.g., beyond 5% engaged, beyond 10% engaged, etc.). If the accelerator pedal 472 is not pressed beyond the second threshold level, the vehicle 10 may not be able to maintain a constant speed. By way of another example, the suspension controller 400 may disable the weight estimation operation if the service brake pedal 474 is pressed (e.g., past 0% engaged).

In some embodiments, the suspension controller 400 monitors the extent to which the accelerator pedal 472 is engaged and disables the weight estimation operation if a rate of change (e.g., an instantaneous rate of change) in accelerator pedal engagement is beyond a certain level. By way of example, the suspension controller 400 may determine the rate of change of accelerator pedal engagement by dividing the magnitude (e.g., absolute value) of the change in accelerator pedal engagement (e.g., 1.8%) over a period of time (e.g., 50 ms) by the length of the period of time. If the magnitude of the rate of change in accelerator pedal engagement is greater than a threshold rate of change, the operator may be attempting to accelerate the vehicle 10.

In some embodiments, the suspension controller 400 monitors a signal from the IMU 470 and determines a lateral, longitudinal, vertical, or other acceleration of the vehicle 10. In other embodiments, the suspension controller 400 determines the acceleration using information from the wheel speed sensors 460. Accordingly, the wheel speed sensors 460 may act as acceleration sensors. If the acceleration of the vehicle 10 in any direction is outside a window of a limited bandwidth (e.g., outside of a predetermined target range), then the suspension controller 400 may prevent the weight estimation operation. In other embodiments, the suspension controller 400 determines a rate of change (e.g., an instantaneous rate of change) of the acceleration and disables the weight estimation operation if the rate of change of acceleration in any direction is beyond a threshold level. By way of example, the suspension controller 400 may determine the rate of change of an acceleration by dividing the absolute value of the change in acceleration over a period of time (e.g., 50 ms) by the length of the period of time.

In some embodiments, the suspension controller 400 monitors the spring length of each spring using the spring length sensors 452. In some such embodiments, the suspension controller 400 disables the weight estimation operation if the difference in spring length between any two springs corresponding to one axle assembly 210 is above a threshold level. By way of example, if the front left and front right springs have significantly different spring lengths, then the body of the vehicle 10 may be tiled, which could cause cabin center of gravity shifting. Alternatively, the suspension controller 400 may disable the weight estimation operation if the difference in spring length between any of the springs is above a threshold level. In other such embodiments, the suspension controller 400 determines a spring velocity (i.e., a rate of change of spring length) of each of the springs. The suspension controller 400 may disable the weight estimation operation if the magnitude (e.g., absolute value) of any spring velocity is at or above a threshold spring velocity. In other such embodiments, the suspension controller 400 determines a rate of change (e.g., an instantaneous rate of change) of the spring velocity (e.g., similarly to the process of determining the rate of change in accelerator pedal position engagement described above) and disables the weight estimation operation if the rate of change of spring velocity is greater than a threshold rate of change.

The weight $W_S$ determined by the suspension controller 400 may facilitate leveling the vehicle 10. In certain leveling arrangements, the weight $W_S$ is used by the suspension controller 400 to determine a target pressure for each of the of gas springs and/or a location of a center of gravity of the vehicle 10. Conventional stationary, minimum discretion weight estimations may not be accurate, limiting the ability of the suspension controller 400 to level the vehicle 10 and calculate the position of the center of gravity 502. Using this inaccurate weight estimate would cause the vehicle 10 to level poorly and lead to an inaccurate location of the center of gravity 502. The weight estimation outlined herein leads to a better leveling of the vehicle 10 and a more accurate location of the center of gravity than the conventional method.

In some embodiments, the vehicle 10 further includes a continuous tire inflation (CTI) system 480 controlled by the controller 432 or the suspension controller 400. The CTI system 480 maintains target tire pressures in each wheel and tire assembly 44 of the vehicle 10. The CTI system 480 may include compressors, reservoirs, accumulators, valves, or other components to facilitate providing or removing pressurized gas (e.g., air) from the wheel and tire assemblies 44. In some embodiments, the suspension controller 400 provides different target tire pressures to the CTI system 480 for each wheel and tire assembly 44 based on the loading of the vehicle 10. In some such embodiments, the suspension controller 400 is configured to use the weight $W_S$ estimated by the suspension controller 400 to determine the target tire pressure of one or more of the wheel and tire assemblies 44. The weight $W_S$ may be used to automatically select between one or more configurations (e.g., armored or unarmored configurations). By way of example, the suspension controller 400 may be configured to determine that the vehicle 10 is in an armored configuration when the weight $W_S$ is above a threshold weight and otherwise determine that the vehicle 10 is in an unarmored configuration. The suspension controller 400 may further select between one or more types of terrain on which the vehicle 10 will operate (e.g., in response to a user input). The configuration and the selected terrain may be used to determine target tire pressures. Target tire pressures corresponding with different weight estimates, terrains, and configurations may be stored in the memory 422.

Referring to FIG. 6, after determining the forces $F_1$, $F_2$, and $F_3$ and the weight $W_S$ of the sprung mass 500, the suspension controller 400 may be configured to determine a longitudinal position of the center of gravity 502 of sprung mass 500 by performing a moment balance on the sprung mass 500. When performing the longitudinal center of gravity estimation, the suspension controller 400 may instruct the operator (e.g., through a user interface, the display 434) to drive straight along a flat road at a constant speed. The suspension controller 400 may use information from the various sensors to determine if the vehicle 10 is in an appropriate condition to perform a longitudinal center of gravity estimation (e.g., if the vehicle 10 is traveling straight along a substantially flat road at a substantially constant speed). By way of example, the suspension controller 400 may use information from the steering angle sensors 440, spring length sensors 452, and wheel speed sensors 450 and/or the IMU 470 to determine if the vehicle 10 is turning, if the road is flat, and if the vehicle 10 is traveling at a constant speed, respectively. If the steering angle sensors 440 indicate that one of the wheel and tire assemblies 44 is rotates beyond a threshold angle relative to a longitudinal axis, the suspension controller 400 may disable determination of the longitudinal position of the center of gravity 502. If the spring velocity of any spring is greater than a threshold spring velocity, the suspension controller 400 may disable determination of the longitudinal position of the center of gravity 502. If the vehicle speed measured by the wheel speed sensors 450 varies by greater than a threshold amount while the longitudinal position of the center of gravity 502 is being determined, the suspension controller 400 may disable determination of the longitudinal position of the center of gravity 502. Alternatively, the suspension controller 400 determine whether or not to disable determination of the longitudinal position of the center of gravity 502 based on the same operational conditions used to disable the weight estimation operation. In other embodiments, the longitudinal center of gravity estimation is performed while the vehicle 10 is stationary.

The suspension controller 400 may be configured to perform a moment balance on the sprung mass 500 about an axis of the vehicle 10. By way of example, the suspension controller 400 may perform a moment balance about an axis running parallel to and through the center of Axle 1, the frontmost axle. The sum of moments about Axle 1 is equal to zero (e.g., $\Sigma M_{Axle1}=0$) because there is no rotational movement or acceleration of the sprung mass 500 about this axis when the vehicle is traveling along a flat road at a constant speed. Accordingly, the suspension controller 400 determines the longitudinal position of the center of gravity 502 using the equation:

$$L_{1toC}=(F_2 * L_{1to2}+F_3 * L_{1to3})/W_S \qquad (4)$$

Alternatively, the moment balance may be performed about a different axis to determine the longitudinal location of the center of gravity 502 relative to another part of the vehicle 10.

Once the longitudinal position of the center of gravity 502 of the vehicle 10 is determined, the suspension controller 400 may be configured to determine a vertical position of the center of gravity 502. When performing the vertical center of gravity estimation, the suspension controller 400 may instruct the operator (e.g., through a user interface or display) to drive straight along a flat road with a constant acceleration The suspension controller 400 may use information from the various sensors to determine if the vehicle 10 is in an appropriate condition to perform a vertical center of gravity estimation (e.g., if the vehicle 10 is traveling straight along a substantially flat road at a substantially constant acceleration). By way of example, the suspension controller 400 may use information from the steering angle sensors 440, spring length sensors 452, and wheel speed sensors 450 and/or the IMU 470 to determine if the vehicle 10 is turning, if the road is flat, and if the vehicle 10 is traveling at a constant acceleration, respectively. If the steering angle sensors 440 indicate that one of the wheel and tire assemblies 44 is rotates beyond a threshold angle relative to a longitudinal axis, the suspension controller 400 may disable determination of the vertical position of the center of gravity 502. If the spring velocity of any spring is greater than a threshold spring velocity, the suspension controller 400 may disable determination of the vertical position of the center of gravity 502. If the acceleration in any direction measured by the IMU 470 varies by greater than a threshold amount while the vertical position of the center of gravity 502 is being determined, the suspension controller 400 may disable determination of the vertical position of the center of gravity 502. Alternatively, the suspension controller 400 determine whether or not to disable determination of the vertical position of the center of gravity 502 based on the same operational conditions used to disable the weight estimation operation.

In this set of conditions, the center of gravity 502 experiences an acceleration $A_{long}$ parallel to a longitudinal axis of the vehicle 10. In some embodiments, the suspension controller 400 uses the IMU 470 to determine the longitudinal acceleration $A_{long}$. In other embodiments, the suspension controller 400 uses the wheel speed sensors 460 to determine the longitudinal acceleration $A_{long}$. Depending on the height of the center of gravity 502, the longitudinal acceleration $A_{long}$ will impart a varying moment effect on the sprung mass 500. This moment effect increases vertical forces F on the axle assemblies 201 rearward of the center of gravity 502 (e.g., Axle 2 and Axle 3 as shown in FIG. 6) and decreases the vertical force F on the axle assemblies 201 forward of the center of gravity 502 (e.g., Axle 1 as shown in FIG. 6). The suspension controller 400 may be configured to perform a summation of forces (e.g., in the longitudinal direction) and/or a summation of moments (e.g., about the center of gravity 502) to determine the vertical position of the center of gravity 502. Accordingly, the suspension controller 400 may calculate the height of the center of gravity 502 relative to the ground ($H_{CtoAxle}$) or the height relative to the centers of the wheel and tire assemblies 44 ($H_{CtoGround}$) using the acceleration $A_{long}$, the vertical wheel forces $F_1$, $F_2$, and $F_3$, and the longitudinal dimensions $L_{1to2}$, $L_{1to3}$, and $L_{1toC}$. The suspension controller 400 may convert between these two heights using the equation:

$$H_{CtoAxle} = H_{CtoGround} - R_{wheel} \quad (5)$$

The suspension controller 400 may then determine the vertical position of the center of gravity 502 relative to the sprung mass 500. By way of example, the ride height of the sprung mass 500 may be varied and/or the sprung mass 500 may have some pitch and/or roll relative to the ground. Accordingly, sprung mass 500 does not have a fixed position relative to the ground or the wheel and tire assemblies 44. To determine the vertical position of the center of gravity 502 relative to the sprung mass 500, the suspension controller 400 may use the position of the sprung mass 500 relative to the to the ground or relative to the centers of the wheel and tire assemblies 44. By way of example, the suspension controller 400 may use the spring lengths of each spring to determine the position and/or orientation of the sprung mass 500 relative to the ground or relative to the wheel and tire assemblies 44. The suspension controller 400 may additionally or alternatively use the IMU 470 to determine an orientation (e.g., a pitch angle) of the sprung mass 500. The relationship of the spring lengths and the information from the IMU 470 to the position and orientation of the sprung mass 500 relative to the ground or relative to the wheel and tire assemblies 44 may be predetermined and stored in the memory 422. The suspension controller 400 may then use the height $H_{CtoAxle}$ or the height $H_{CtoGround}$ along with the position and orientation of the sprung mass 500 relative to the wheel and tire assemblies 440 or the ground to determine the vertical position of the center of gravity 502 relative to the sprung mass 500. In other embodiments, the suspension controller 400 determines the vertical position of the center of gravity 502 relative to the sprung mass 500 directly.

In some embodiments, the suspension controller 400 is configured to determine the lateral location of the center of gravity 502 (e.g., relative to the center plane 600). In some such embodiments, the suspension controller 400 is configured to determine a weight faction $f_L$, where the weight fraction indicates the fraction of the weight $W_S$ of the sprung mass 500 that is supported by the gas springs on the left side of the vehicle 10. The suspension controller 400 first determines the total weight supported by the springs on the left side of the vehicle $F_L$ and the total weight supported by the springs on the right side of the vehicle $F_R$ by adding the individual vertical wheel forces on each respective side of the vehicle. The suspension controller 400 then calculates the weight fraction as $f_L = F_L/W_S$. The suspension controller 400 may use the weight fraction to determine a lateral location of the center of gravity 502. By way of example a weight fraction $f_L = 0.5$ would indicate that the center of gravity 502 is disposed along a longitudinal centerline of the vehicle 10.

In other such embodiments, the suspension controller 400 instructs the operator to drive in a circle such that the center of gravity 502 follows a circular path. When following a circular path, the center of gravity 502 experiences a tangential acceleration oriented tangentially to the circular path of the center of gravity 502 and a centripetal acceleration oriented towards the center of the circular path of the center of gravity 502. The net acceleration of the center of gravity 502 includes a longitudinal component $A_{long}$ and a lateral component $A_{lat}$. Using information from at least one of the IMU 470, the steering angle sensors 440, the wheel speed sensors 460 and the spring pressure sensors 450, the suspension controller 400 may be configured to determine the lateral location of the center of gravity 502.

In some embodiments, the location of the center of gravity 502 is used by the suspension controller 400 to control and/or monitor the stability of the vehicle 10. In some embodiments, the suspension controller 400 uses the location of the center of gravity 502 to determine a stability modulus of the vehicle 10. The suspension controller 400 may be configured to alter driving characteristics of the vehicle 10 based at least in part on the location of the center of gravity 502. By way of example, the controller 442 may disable the vehicle 10 (e.g., by disengaging the primary driver, by applying brakes, by preventing adjustment of the suspension, etc.) in response to a determination that the center of gravity 502 is outside of a predefined region. By way of example, the suspension controller 400 may disable the vehicle 10 if the center of gravity 502 extends a predetermined distance beyond a reference point on the vehicle 10 or beyond predefined lateral, longitudinal, and/or vertical distance thresholds relative to part of the vehicle 10. In some embodiments, the suspension controller 400 is configured to indicate the location of the center of gravity 502 to an operator (e.g., using the display 324). The location of the center of gravity 502 may be used when loading the vehicle 10 in order to place certain loads in a desired relation to the center of gravity 502. In some embodiments, the suspension controller 400 uses the location of the center of gravity 502 when adjusting the suspension to determine a target pressure in each spring.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A vehicle, comprising:
   a sprung mass including a cabin coupled to a chassis;
   a plurality of tractive assemblies each including at least one tractive element;
   a plurality of springs coupling the tractive elements to the sprung mass, wherein each spring is configured to impart an upward force on the sprung mass;
   a plurality of load sensors each configured to provide a signal indicative of the force imparted by one of the springs;
   an acceleration sensor configured to provide a signal indicative of an acceleration of the vehicle; and
   a controller operatively coupled to the load sensors and the acceleration sensor, wherein the controller is configured to determine a weight of the sprung mass using the signals from the load sensors, and wherein the controller is configured to disable determination of the weight if the acceleration of the vehicle falls outside of a target range.

2. The vehicle of claim 1, further comprising a speed sensor operatively coupled to the controller and configured to provide a signal indicative of a speed of the vehicle, and wherein the controller is configured to disable determination of the weight if the speed of the vehicle is below a threshold speed.

3. The vehicle of claim 1, wherein the controller is configured to disable determination of the weight in response to an indication that a braking force is being applied to at least one of the tractive elements.

4. The vehicle of claim 1, wherein the signal from the acceleration sensor is indicative of a lateral acceleration, a longitudinal acceleration, and a vertical acceleration of the vehicle, and wherein the controller is configured to disable determination of the weight if an acceleration of the vehicle in any direction falls outside of the target range.

5. The vehicle of claim 1, wherein the controller is configured to determine a rate of change of the acceleration of the vehicle, and wherein the controller is configured to disable determination of the weight if a magnitude of the rate of change of the acceleration of the vehicle is greater than a threshold rate of change.

6. The vehicle of claim 1, wherein the controller is configured to disable determination of the weight if at least one of the signals from the load sensors is not available.

7. The vehicle of claim 1, wherein the springs are gas springs containing compressed gas, and wherein the load sensors are pressure sensors each configured to provide a signal indicative of a pressure of the compressed gas within the corresponding gas spring.

8. A vehicle, comprising:
a sprung mass including a cabin coupled to a chassis;
a plurality of tractive assemblies each including at least one tractive element;
a plurality of springs coupling the tractive elements to the sprung mass, wherein each spring is configured to impart an upward force on the sprung mass;
a plurality of load sensors each configured to provide a signal indicative of the force imparted by one of the springs;
an accelerator interface configured to be engaged by an operator, wherein a driver of the vehicle is configured to output mechanical energy to propel the vehicle based on a level of engagement of the accelerator interface; and
a controller operatively coupled to the load sensors, wherein the controller is configured to determine a weight of the sprung mass using the signals from the load sensors, wherein the controller is configured to receive a signal indicative of the level of engagement of the accelerator interface, and wherein the controller is configured to selectively disable determination of the weight based on the level of engagement of the accelerator interface.

9. The vehicle of claim 8, wherein the controller is configured to determine a rate of change of the level of engagement of the accelerator interface, and wherein the controller is configured to disable determination of the weight if a magnitude of the rate of change of the level of engagement of the accelerator interface is greater than a threshold rate of change.

10. The vehicle of claim 8, wherein the springs are gas springs containing compressed gas, and wherein the load sensors are pressure sensors each configured to provide a signal indicative of a pressure of the compressed gas within the corresponding gas spring.

11. A vehicle, comprising:
a sprung mass including a cabin coupled to a chassis;
a plurality of tractive assemblies each including a pair of tractive elements;
a plurality of springs coupling the tractive elements to the sprung mass, wherein each spring is configured to impart an upward force on the sprung mass;
a plurality of load sensors each configured to provide a signal indicative of the force imparted by one of the springs;
a plurality of position sensors each configured to provide a signal indicative of a position of one of the tractive elements relative to the sprung mass; and
a controller operatively coupled to the load sensors, wherein the controller is configured to determine a weight of the sprung mass using the signals from the load sensors, wherein the controller is configured to determine a difference between the heights of the pair of tractive elements corresponding to each tractive assembly, and wherein the controller is configured to disable determination of the weight if any of the differences are greater than a threshold value.

12. The vehicle of claim 11, wherein the springs are gas springs containing compressed gas, and wherein the load sensors are pressure sensors each configured to provide a signal indicative of a pressure of the compressed gas within the corresponding gas spring.

13. A vehicle, comprising:
a sprung mass including a cabin coupled to a chassis;
a plurality of tractive assemblies each including at least one tractive element;
a plurality of springs coupling the tractive elements to the sprung mass, wherein each spring is configured to impart an upward force on the sprung mass;
a plurality of load sensors each configured to provide a signal indicative of the force imparted by one of the springs;
a plurality of spring length sensors each configured to provide a signal indicative of a length of one of the springs; and
a controller operatively coupled to the load sensors and the spring length sensors, wherein the controller is configured to determine a weight of the sprung mass using the signals from the load sensors, wherein the controller is configured to determine a spring velocity of each spring, and wherein the controller is configured to disable determination of the weight if a magnitude of the spring velocity of any of the springs is greater than a threshold spring velocity.

14. The vehicle of claim 13, wherein the controller is configured to determine a rate of change of the spring velocity of each spring, and wherein the controller is configured to disable determination of the weight if a magnitude of the rate of change of the spring velocity of any of the springs is greater than a threshold rate of change.

15. The vehicle of claim 13, wherein the springs are gas springs containing compressed gas, and wherein the load sensors are pressure sensors each configured to provide a signal indicative of a pressure of the compressed gas within the corresponding gas spring.

16. A vehicle, comprising:
a sprung mass including a cabin coupled to a chassis;
a plurality of tractive assemblies each including at least one tractive element;
a plurality of springs coupling the tractive elements to the sprung mass, wherein each spring is configured to impart an upward force on the sprung mass;
a plurality of load sensors each configured to provide a signal indicative of the force imparted by one of the springs;

a plurality of spring length sensors each configured to provide a signal indicative of a length of one of the springs; and a controller operatively coupled to the load sensors, wherein the controller is configured to determine a weight of the sprung mass using the signals from the load sensors, wherein the controller is configured to monitor at least one operational condition of the vehicle, and wherein the controller is configured to determine whether or not to disable determination of the weight based on the at least one operational condition; and wherein the controller is configured to use the signals from at least two of the spring length sensors to determine forces imparted on the springs by a sway bar of the vehicle, and wherein the controller is configured to determine the weight of the sprung mass based in part on the forces imparted on the springs by the sway bar.

17. The vehicle of claim 16, wherein the springs are gas springs containing compressed gas, and wherein the load sensors are pressure sensors each configured to provide a signal indicative of a pressure of the compressed gas within the corresponding gas spring.

18. The vehicle of claim 16, wherein the controller is configured to disable determination of the weight if at least one of the signals from the load sensors is not available.

19. The vehicle of claim 16, further comprising a speed sensor operatively coupled to the controller and configured to provide a signal indicative of a speed of the vehicle, and wherein the controller is configured to disable determination of the weight if the speed of the vehicle is below a threshold speed.

20. The vehicle of claim 16, further comprising an acceleration sensor operatively coupled to the controller and configured to provide a signal indicative of an acceleration of the vehicle, wherein the controller is configured to disable determination of the weight if the acceleration of the vehicle falls outside of a target range.

* * * * *